3,551,192
METHOD OF IMPARTING BIOLOGICALLY ACTIVE MATERIALS TO ARTICLES OF MANUFACTURE

Andrew J. Reinert, Bartlesville, Okla., assignor to Phillips Petroleum Company, a corporation of Delaware
No Drawing. Filed May 25, 1967, Ser. No. 641,158
Int. Cl. B44d 1/22; C09d 5/14; D02g 3/36
U.S. Cl. 117—138.8
9 Claims

ABSTRACT OF THE DISCLOSURE

Biologically active materials, such as a rodent repellent, are incorporated onto articles of manufacture by contacting the article with a mixture of a hydrocarbon diluent, amorphous polyolefin, and biologically active material.

---

This invention relates to biologically active materials. In one aspect, this invention relates to a method of imparting biologically active materials to articles of manufacture. In another aspect, this invention relates to compositions having biologically active materials incorporated thereon.

The protection of articles of manufacture of polyolefins, such as synthetic fabricated material and the like, against attack by rodents, fungi, insects, etc., and the resultant destruction of the fabricated material by the like, presents a problem of major significance in the use of these articles of manufacture in extensiv outdoor applications. For example, great damage is suffered annually because of rodents gnawing through fabricated materials, cordage, electrical insulation and the like. Similarly, when grain and other food products are stored in bags fabricated from synthetic fibers, rats and mice cause considerable damage and loss by cutting through the bags. In the case of electrical and communication line insulation, rats, squirrels gophers, and other rodents frequently destroy the insulative material around electrical conductors and thereby create fire hazards or cause interruptions of service.

Attempts to prevent damage to articles of manufacture, such as materials fabricated of synthetic fibers, by repelling, killing, sterilizing, inhibiting, or otherwise influencing the life processes of life forms that can be pestiferous such as mammals, arthropods, microbes, fungi, and the like are constantly being sought. However, many problems have been incurred in attempting to apply biologically active materials to polyolefin articles of manufacture, such as fabricated materials of synthetic fibers of polyolefins, because of the difficulty of imparting the biologically active material onto the surface of or incorporating the biologically active material into the polyolefin article of manufacture.

According to this invention, these and other problems and disadvantages of the prior art methods of incorporating biologically active materials onto articles of manufacture of polyolefins are overcome by a novel method and composition for imparting the biologically active material to the polyolefin article thereby discouraging pestiferous forms of life from damaging the article of manufacture which includes passing the article through a mixture containing hydrocarbon diluent, amorphous polyolefin, and biologically active material in order to impart the biologically active material onto the article.

Accordingly, it is an object of this invention to provide a method of imparting biologically active material onto articles of manufacture of polyolefins.

Another object of this invention is to provide a novel treating composition containing biologically active material.

A further object of this invention is to provide a simple and efficient method of preventing pestiferous forms of life from damaging articles of manufacture produced of polyolefins.

These and other objects of the invention will become apparent to one skilled in the art from studying the following detailed description and the appended claim.

In the practice of this invention polyolefin articles of manufacture are contacted with a mixture of hydrocarbon, amorphous polyolefin, and biologically active material at a temperature within the range of about 35° F. to about 180° F. for a sufficient period of time to allow thorough contacting between the article and the mixture to produce a coated article having incorporated thereon the biologically active material, thereby preventing pestiferous forms of life from attacking and destroying the article. However, it is desirable not to heat the mixture above its boiling point which will vary somewhat depending on the particular hydrocarbon diluent employed.

Once the article is thoroughly contacted with the mixture the article is removed and dried by any suitable method such as exposing the treated article to ventilation or mildly heating to remove substantially all of the hydrocarbon diluent and thus produce a coating on the article of the amorphous polyolefin and the biologically active material. Although it is desirable to remove the diluent to provide a solidified coating it is to be understood that a minor amount of the diluent may remain due to being held within the amorphous polyolefin.

Biologically active materials, as the term is used in this application, are those materials known to repel, kill, sterilize, inhibit, or otherwise influence the life processes of life forms that can be pestiferous such as mammals, arthropods, fungi, microbes, and the like.

Examples of suitable biologically active materials which can be used according to the present invention are:

Fungicides:
    Captan; N-trichloromethyl mercapto-4-cyclohexene-1,2-dicarboximide
    Sulfur
    Basic copper chloride
    Copper zinc chromate Repellents (arthropod):
    Benzyl benzoate
    N-butyl acetanilide
    2,2-dimethyl-6-carbobutoxy-2,3-dihydropyrone
    Dibutyl adipate
    Dibutylphthalate
    Dimethylphthalate
    2,3,4,5-bis($\Delta$2-butylene)-tetrahydrofurfural
    Butadiene ammination product
    3-chloropropyl-n-octylsulfoxide
    Di-n-propyl ester of pyridine-2,5-dicarboxylic acid
    2-benzyl-p-cresol Lethals (arthropod):
    Aldrin; 1,2,3,4,10,10 - hexachloro - 1,4,4-alpha,5,8,8-alpha-hexahydro - 1,4 - endoexo-5,8-dimethanonaphthalene
    BHC; 1,2,3,4,5,6-hexachlorocyclohexane
    Chlordane; 2,3,4,5,6,7,8,8 - octachloro-4,7-methano-3-alpha,4,7,7-alpha-tetrahydroindane
    DDT; 1,1,1-trichloro-2,2-bis(p-chlorophenyl)ethane
    Malathion; O,O-dimethyl-S-(1,2-dicarbethoxyethyl) dithiophosphate DDVP; O,O-dimethyl-O-(2,2 - dichlorovinyl)phosphate
Pyrethrins
p-Dichlorobenzene
Naphthalene
Azobenzene
Chlorobenzilate; ethyl-2-hydroxy-2,2-bis(4 - chlorophenyl)acetate
DNOSBP; 2,4-dinitro-6-sec-butyl phenol
Sulphenone; p-chlorophenyl-phenyl sulfone
Dimite; 1,1-bis(p-chlorophenyl)ethanol
Kelthane; 1,1 - bis(chlorophenyl)2,2,2 - trichloroethanol Repellents (vertebrate):
    Tert-butylsulfenyldimethyldithiocarbamate
    Zinc dimethyldithiocarbamate
    Piperine
    N,N,1,1-tetramethyl-2-butynylamine
    Bone Oil
    Oil of lemon The amorphous polyolefins employed in accordance with the method of this invention can be thus produced from olefins having 2–4, inclusive, carbon atoms such as ethylene, propylene, and butene-1, and can be obtained as the products from a variety of different polymerization processes. For example, amorphous polypropylene is normally formed in the polymerization of propylene to form crystalline polypropylene. It can be recovered from this reaction product by any suitable technique such as that described in Belgian Pat. 538,782. The amorphous polypropylene can be separated and recovered from the total polymer reaction product because it is soluble in many hydrocarbon solvents such as xylene or pentane at a temperature and pressure wherein the crystalline polypropylene is insoluble.

The amorphous polypropylene used in the solution to impart the biologically active material to the synthetic fiber can be in the form in which it is recovered from the hydrocarbon solvent. If desired, the recovered amorphous polypropylene can be refined to remove the unavoidably entrained catalyst residues and residual hydrocarbon solvents. When desirable to improve the appearance of the product the recovered amorphous polypropylene can be subjected to a purification step. The recovered amorphous polypropylene can be contacted with aqueous sulfuric acid in the form of a wash treatment which can be followed by contacting with a conventional filtration clay to remove catalyst residues, etc. The amorphous polypropylene employed in the practice of the present invention has a molecular weight in the range of about 2,000 to about 100,000 as determined by light scattering, a density (ASTM D 1505–60T) in the range of about 0.83 to about 0.90 at 25° C., and a crystallinity of less than about 10 percent as determined by X-ray diffraction. It can be formed by polymerizing propylene with any catalyst system well known in the art. It must be understood that while the production of amorphous polypropylene has been described in detail, it is for the purpose of illustration only, and the amorphous polymer in the polymerization of any olefin having 2–4, inclusive carbon atoms, can be employed by the present invention.

The hydrocarbon diluents which can be employed in accordance with the present invention are those hydrocarbons having from 20–20, inclusive, carbon atoms. Examples of suitable hydrocarbons are ethane, eicosane, 3-methyl-6-heptyldecane, benzene, cyclooctane, octylbenzene, propane, 4-isobutyl-2,5-dimethylheptane, xylene, pinane, bornane, thujane, 1,5,5,6-tetramethyl-1,3-cyclohexadiene, p-terphenyl, 1-benzylnaphthalene, cyclohexane, 1-cyclodecen-4-yne, 2-hexene, and the like, and mixtures thereof.

While any hydrocarbon having from 2–20 carbon atoms, inclusive, can be employed by the present invention, the preferred hydrocarbons are aromatic or alkylaromatic hydrocarbons having 6–18 carbon atoms, inclusive, such as benzene, toluene, xylene, ethylbenzene, naphthalene, anthracene, isopropyl benzene, cumene, cymene, and the like, and mixtures thereof.

The biologically active materials of this invention can be applied by the method of this invention to articles of manufacture, such as polyolefin fibers produced from the polymerization of monoolefins having 2–8 carbon atoms, inclusive, copolymers and mixtures thereof and fibrilated sheet, ribbon, etc. of polyester, polyamide, polyurethane, and other fiber forming synthetics by passing the synthetic fiber through a mixture comprised of amorphous polyolefin, biologically active material, and hydrocarbon solvent.

Examples of suitable monoolefins which can be employed to produce the article of manufacture which is coated in accordance with the present invention are ethylene, propylene, n-butene, pentene, hexene-1, 4-methyl pentene-1, heptene-1, octene-1, and the like.

Any suitable means of contacting the article with the treating mixture, such as floating the solution on a quench bath in order to contact the article and the mixture can be employed. The mixture containing the hydrocarbon, the biologically active material, and the amorphous polyolefin contains from about 1–25 weight percent amorphous polyolefin, preferably from about 5–20 weight percent amorphous polyolefin, and from about 0.5 to 25 weight percent biologically active material, preferably from about 10–20 weight percent biologically active material. However, it should be noted that the amount of biologically active material added to the solution depends upon the particular biologically active material employed and the toxicity of the material.

A series of tests was conducted in which a mixture comprising amorphous polypropylene having a molecular weight in the range of about 2,000 to about 100,000, a density in the range of about 0.83 to about 0.90, and a crystallinity of less than 10 percent xylene, and teretbutylsulfenyl-dimethyldithio-carbamate was employed to treat a commercial foamed polypropylene twine. The following table illustrates the results of these tests.

TABLE I

| | Run No. | | | | | |
|---|---|---|---|---|---|---|
| | 1 (Control) | 2 | 3 (Control) | 4 | 5 | 6 |
| Mixture composition, wt. percent: | | | | | | |
| Amorphous polypropylene | 0 | 20 | 0 | 5 | 10 | 20 |
| Rodent repellent [1] | 20 | 20 | 10 | 10 | 10 | 10 |
| Xylene | 80 | 60 | 90 | 85 | 80 | 70 |
| Dip times, sec. | 3–4 | 3–4 | 3–4 | 3–4 | 3–4 | 3–4 |
| Dip temp., ° F | 94 | 94 | 94 | 94 | 94 | 94 |
| Exposed to ventilation, days [2] | 3 | 3 | 3 | 3 | 3 | 3 |
| Physical condition of fibers | ---- | (3) | ---- | (4) | (5) | (3) |
| Repellent remaining [3] | (7) | (8) | (7) | (9) | (9) | (9) |

[1] Rodent repellent was tert-butylsulfenyldimethyldithiocarbamate.
[2] Temperatures ranged from 70–110° F.
[3] Tack.
[4] Very slight tack.
[5] Slight tack.
[6] As determined by odor of twine samples.
[7] None.
[8] Very strong.
[9] Strong.

From the above data it is clearly evident that by contacting an article of manufacture with a mixture containing amorphous polyolefin, hydrocarbon diluent and a biologically active material that the biologically active material is incorporated onto the surface of the article whereas when the amorphous polyolefin is not employed in the mixture the biologically active material is not incorporated onto the article.

The preceding example illustrates the effectiveness of employing a mixture comprising amorphous polypropylene, xylene, and tert-butylsulfenyldimethyldithiocarbamate to incorporate the biologically active material, the tert-butylsulfenyldimethyldithio-carbamate onto the synthetic polyolefin fiber. However, it is to be understood that the example is for the purpose of illustration only and must not be considered to be limiting of the invention.

Although the invention has been described in considerable detail, it is to be understood that such detail is for the purpose of illustration only. It is apparent that many variations and modifications can be made without departing from the spirit and scope of the invention.

I claim:

1. A method for imparting biologically active materials to polyolefin articles of manufacture of monomers having 2–8 carbon atoms, inclusive, and which are subject to attack comprising contacting said article with a mixture comprising amorphous polyolefin of a monomer having 2–4 carbon atoms, inclusive, biologically active material, and a hydrocarbon diluent to produce a coated article and subsequently drying said coated article to remove said diluent.

2. The process according to claim 1 wherein said amorphous polyolefin is present in the amount in the range of 1 to 25 weight percent and said biologically active material is present in the amount ranging from about 0.5 to 25 weight percent, and said mixture is at a temperature within the range of about 35° F. to about 180° F.

3. The process according to claim 2 wherein said amorphous polyolefin is present in the range of about 5 to 20 weight percent, and said biologically active material is present in the range of about 5 to 20 weight percent.

4. The process according to claim 1 wherein said hydrocarbon diluent is a hydrocarbon having from about 2 to 20, inclusive, carbon atoms.

5. The process according to claim 4 wherein said hydrocarbon diluent is selected from the group consisting of aromatic hydrocarbons, alkyl aromatic hydrocarbons, and mixtures thereof, said hydrocarbon diluent having from 6–18, inclusive, carbon atoms.

6. A process according to claim 1 wherein said biologically active materials are selected from the group consisting of arthropod lethals, fungicides, arthropod repellents, and vertebrate repellents.

7. A process according to claim 1 wherein said article of manufacture is polypropylene fiber, said amorphous polyolefin is polypropylene, and is present in the range of about 1 to 25 weight percent, said diluent is xylene, and said biologically active material is tert-butylsulfenyldimethyldithiocarbamate and is present in the range of about 0.5 to 25 weight percent.

8. A treated polyolefin article of manufacture having coated on the surface thereof a mixture comprising amorphous polyolefin of a monomer having 2–4 carbon atoms, inclusive, and a biologically active material.

9. The treated polyolefin article of manufacture according to claim 8 wherein said article of manufacture is polypropylene twine, said amorphous polyolefin is amorphous polypropylene and said biologically active material is tert-butylsulfenyldimethyldithiocarbamate.

References Cited

UNITED STATES PATENTS

| | | | |
|---|---|---|---|
| 2,825,721 | 3/1958 | Hogan et al. | 260—94.3 |
| 2,927,047 | 3/1960 | Schulde et al. | 117—138.8E |
| 3,248,288 | 4/1966 | Wilder et al. | 106—15AF |

OTHER REFERENCES

Baseman, Arnold L., Antimicrobial Agents for Plastics, In Plastics Technology, September 1966, pp. 33, 34, 36 and 37.

ALLAN LIEBERMAN, Primary Examiner

J. H. DERRINGTON, Assistant Examiner

U.S. Cl. X.R.

57—149; 106—15; 117—138.5, 161; 260—33.6; 424—83